(12) United States Patent
Nandy et al.

(10) Patent No.: US 11,153,213 B2
(45) Date of Patent: Oct. 19, 2021

(54) ECMP SET BASED ON ROUTE TIME DELAY

(71) Applicant: Hewlett Packard Enterprise Development LP, Houston, TX (US)

(72) Inventors: Tathagata Nandy, Bangalore (IN); Abhishek Srivastava, Bangalore (IN); Madhusoodhana Chari Sesha, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/866,690

(22) Filed: May 5, 2020

(65) Prior Publication Data

US 2021/0099389 A1    Apr. 1, 2021

(51) Int. Cl.
| | |
|---|---|
| *H04L 12/803* | (2013.01) |
| *H04L 12/851* | (2013.01) |
| *H04J 3/06* | (2006.01) |
| *H04L 12/727* | (2013.01) |
| *H04L 12/707* | (2013.01) |

(52) U.S. Cl.
CPC ......... *H04L 47/125* (2013.01); *H04J 3/0667* (2013.01); *H04L 45/121* (2013.01); *H04L 45/24* (2013.01); *H04L 47/2441* (2013.01)

(58) Field of Classification Search
None
See application file for complete search history.

(56) References Cited

U.S. PATENT DOCUMENTS

| | | | | |
|---|---|---|---|---|
| 8,189,481 | B2* | 5/2012 | Ravindran | H04L 45/302 370/238 |
| 10,616,111 | B1* | 4/2020 | Immidi | H04L 45/245 |
| 2007/0189187 | A1* | 8/2007 | Ryu | H04J 3/0682 370/252 |
| 2014/0036936 | A1* | 2/2014 | Bui | H04J 3/0638 370/503 |
| 2014/0304543 | A1* | 10/2014 | Ilyas | G06F 1/12 713/401 |
| 2016/0073365 | A1* | 3/2016 | Klockar | H04J 3/0667 370/503 |
| 2016/0352620 | A1* | 12/2016 | Schmutzer | H04L 49/90 |

* cited by examiner

*Primary Examiner* — Anh Ngoc M Nguyen
(74) *Attorney, Agent, or Firm* — Hewlett Packard Enterprise Patent Department (57) ABSTRACT

Examples include generating a Precision Time Protocol (PTP) packet for a first nexthop in an Equal Cost Multi-Path set and sending the PTP packet to the first nexthop. Examples also include receiving a response from the first nexthop that identifies a time delay associated with a route to the first nexthop and updating the ECMP based on the time delay.

15 Claims, 5 Drawing Sheets

ECMP SET BASED ON ROUTE TIME DELAY

BACKGROUND

A network may include multiple endpoints attached to networking devices (e.g., routers, switches, etc.). The endpoints may communicate to each other in a variety of ways using the networking devices to relay a data packet across the network. In some examples, a packet is received by a networking device along its pathway to the endpoint and the networking device decides how to forward a packet it receives such that the packet may reach the intended endpoint.

BRIEF DESCRIPTION OF THE DRAWINGS

The following detailed description references the drawings, wherein.

DETAILED DESCRIPTION

In some examples, a networking device that receives a data packet for a specific destination computing device (i.e, endpoint) may store a path to get to the specific destination computing device in a data structure (e.g., forwarding information base) on the networking device. The data structure may detail a next or downstream networking device to which the packet may be forwarded from the current networking device. This next or downstream networking device may be characterized as a nexthop in the path. For example, the forwarding information base may include the interface identifier through which the packet may leave the current networking device to get to the nexthop.

In some examples, there may be multiple paths to get to that specific destination computing device. For example, the data structure may include an Equal Cost Multi Path (ECMP) set. An ECMP set comprises two or more nexthops directly or indirectly connected to the current networking device that have been determined to be of equal cost to each other. The nexthops of an ECMP set may be determined by a routing protocol that is used by the networking device. In theory, the time and/or resources (i.e., the "cost") to send the packet to any of the nexthops in the ECMP set are the same. However, in practice, there may be factors of each nexthop that the routing protocol does not take into account.

For example, the current networking device and the nexthop may be connected by intermediate nodes. These intermediate nodes may be networking devices that operate layer 2 protocols in the seven-layer Open Systems Interconnection (OSI) model. These networking devices may transparently forward data packets to the nexthop and do not have certain functions that may be used by networking devices that operate layer 3 or layer 4 protocols. For example, these networking devices may not utilize ECMP. These intermediate nodes may have a time delay associated with a forwarding chip (e.g., Application Specific Integrated Chip (ASIC)) in the intermediate node. The time delay with these may not be considered by networking protocol that determines the ECMP set.

Accordingly, one nexthop in the ECMP set may be connected via more intermediate nodes than another nexthop in the ECMP set; making the actual cost of the first nexthop different than the other nexthop. Other time delays may also occur, including but not limited to delays caused by network congestion, states of the nexthop, etc. These costs are not captured by the routing protocol. Thus, in these examples, the networking device may forward the packet along the path that is less efficient than another paths that are available because it does not take into account additional costs. In other words, the ECMP set may not represent nexthops that are of equal actual costs.

Examples disclosed herein address these technical problems by providing systems and methods for the current networking device to determine a time delay between itself and a nexthop in an ECMP set. In some examples, the current networking device may send a precision time protocol (PTP) packet to a nexthop in an ECMP set. The current networking device may be set as a Grand Master in the PTP packet and the nexthop may be set as the Slave in the PTP packet. The PTP packet may include a unique identifier that identifies the nexthop. In some examples, the unique identifier may include a Differentiated Services Code Point (DSCP) value. The packet is sent along the networking path to the nexthop, passing through any intermediate nodes between the current networking device and the nexthop. Each networking device calculates the time the packet takes in each networking device and accumulates it in the PTP packet. Upon receiving the PTP packet, the nexthop sends back the accumulated time to the originating networking device. Based on this accumulated time, the originating networking device may update the ECMP set.

Accordingly, examples disclosed herein allow a networking device to differentiate between nexthops in an ECMP set based on additional time delays that are not accounted for in the routing protocol that original set up the ECMP set. Accordingly, based on these additional time delays, a networking device may get the benefit of a few microseconds on each nexthop.

In some examples, a computing device is provided with a non-transitory machine-readable storage medium. The non-transitory machine-readable storage medium includes instructions that, when executed, cause a processing resource to generate a Precision Time Protocol (PTP) packet for a first nexthop in an Equal Cost Multi-Path (ECMP) set, send the PTP packet to the first nexthop, receiving a response from the first nexthop that identifies a time delay associated with a route to the first nexthop, and update the ECMP set based on the time delay.

In some examples, a networking device comprises a memory, a packet engine, and a revision engine. The memory is to store information associated to an ECMP set comprising a nexthop. The packet engine is to generate a PTP packet for the nexthop, send the PTP packet to the nexthop, and receive a response from the nexthop in the ECMP set. The response includes a time delay associated with the nexthop. The revision engine is to update the ECMP set in the memory based on the time delay.

In some examples, a method comprises generating, by a first processing resource, a PTP packet for a nexthop in an ECMP set. The PTP packet includes a unique identifier for the nexthop. The method also comprises sending, by the first processing resource, the PTP packet to the nexthop; receiving, by the first processing resource, a response from the nexthop that identifies a time delay associated with the nexthop; and updating, by the first processing resource, the ECMP set based on the time delay.

Figure 1:
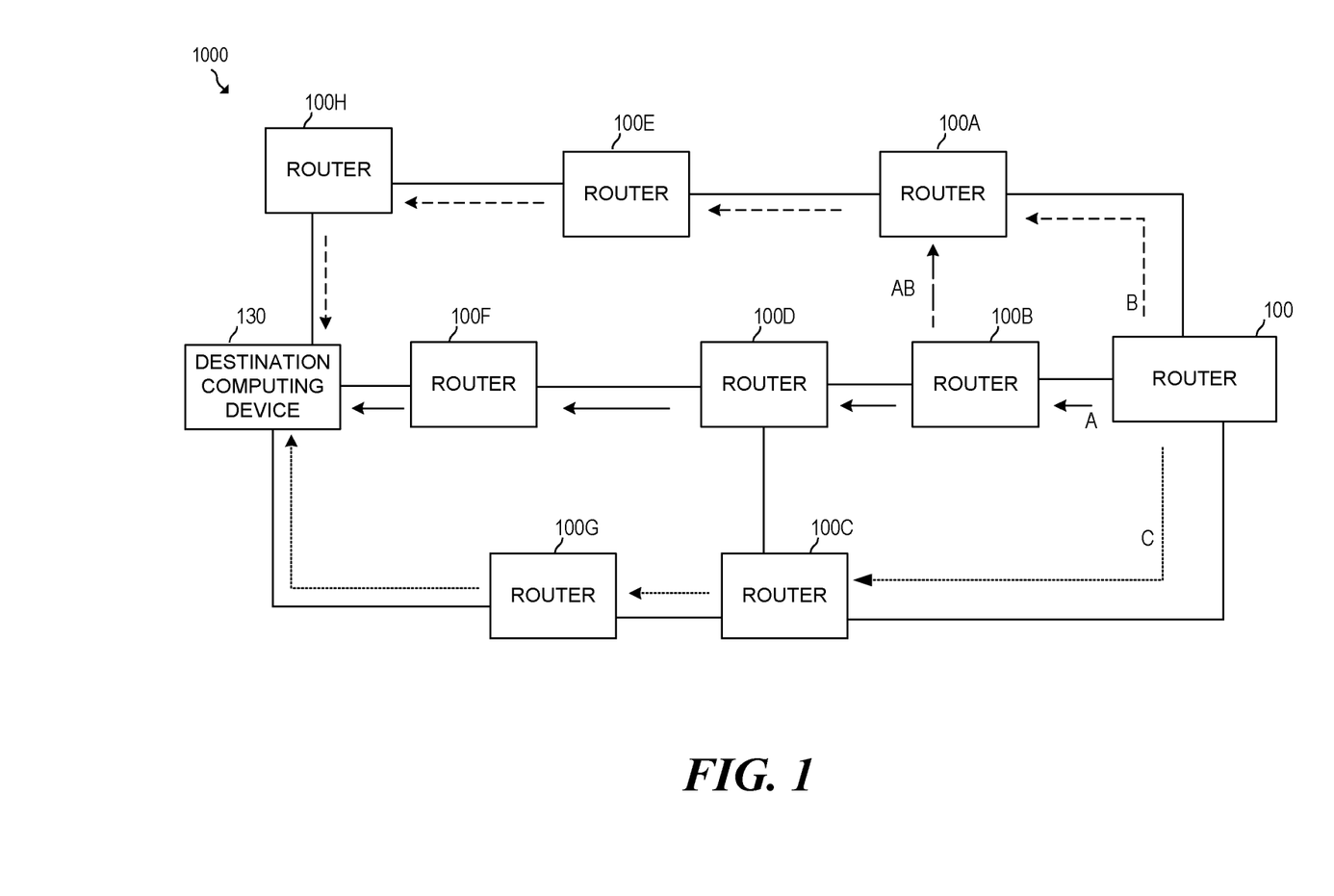
FIG. 1 is a block diagram of a network comprising multiple routes from a router to a destination computing device, according to some examples.

Referring now to the figures, FIG. 1 is a block diagram of a network 1000 comprising multiple routes from a router 100 to a destination computing device 130. As used herein, a destination computing device may be a computing device that is the endpoint for receiving a packet. A data packet that is received by router 100 may take paths A, B, or C to destination computing device 130. The routing protocol used by router 100 may determine that the path to router 100A and 100B are of equal cost and the path to router 100C is of more cost. Accordingly, the routing protocol places router 100A and 100B in an ECMP set. The ECMP set may be stored in a forwarding data structure (such as a forwarding information database (FIB)) on router 100. Accordingly, router 100A and 100B are nexthops in the ECMP set. 100A may be characterized as a "first" nexthop and 100B may be characterized as a "second" nexthop. The use of "first" and "second" are to distinguish one from the other and may or may not coincide with the order in which the nexthops are added to the ECMP set or used by the router 100. Because the path to router 100C is of more cost, it is not placed in the same ECMP set as 100A and 100B. Because router 100B and router 100A are in the same ECMP set, the cost (as determined by the routing protocol) to one router is the same as the cost to the other.

However, network 1000 may also include intermediate nodes (not shown in FIG. 1) between router 100 and router 100E and intermediate nodes (not shown in FIG. 1) between router 100 and 100A. These intermediate nodes may introduce additional cost to the path between router 100 and router 100B and router 100 and router 100A that are not accounted for in the routing protocol. For example, there may additional time for packet processing in the ASIC of the intermediate nodes that adds to the cost of the path. Thus, accordingly, the path to router 100B from router 100 may not be of the same actual cost as the path to router 100A from router 100.

Router 100B likewise also has an ECMP set for paths AB and A. For example, a routing protocol on router 100E may determine that router 100D and router 100A are of the same cost on the way to destination computing device 130 and place router 100D and router 100A into an ECMP set. Because router 100D and router 100A are in the same ECMP set, the cost (as determined by the routing protocol) to one router is the same as the cost to the other from router 100B.

However, network 1000 may also include intermediate nodes (not shown in FIG. 1) between router 100B and router 100D and intermediate nodes (not shown in FIG. 1) between router 100B and 100A. These intermediate nodes may introduce additional cost to the path between router 100B and router 100D and router 100B and router 100A that are not accounted for in the routing protocol. Thus, accordingly, the path to router 1000 from router 100B may not be of the same actual cost as the path to router 100A from router 100B.

Examples discussed herein provide a way for individual routers (e.g., router 100 and router 100B) to better distinguish between nexthops in an ECMP set by taking into account additional costs that are not accounted for by the routing protocol. Although FIG. 1 is described in terms of routers, other networking devices that employ networking protocols that allow for ECMP sets (e.g., switches), may also benefit from the these examples.

Figure 2A:
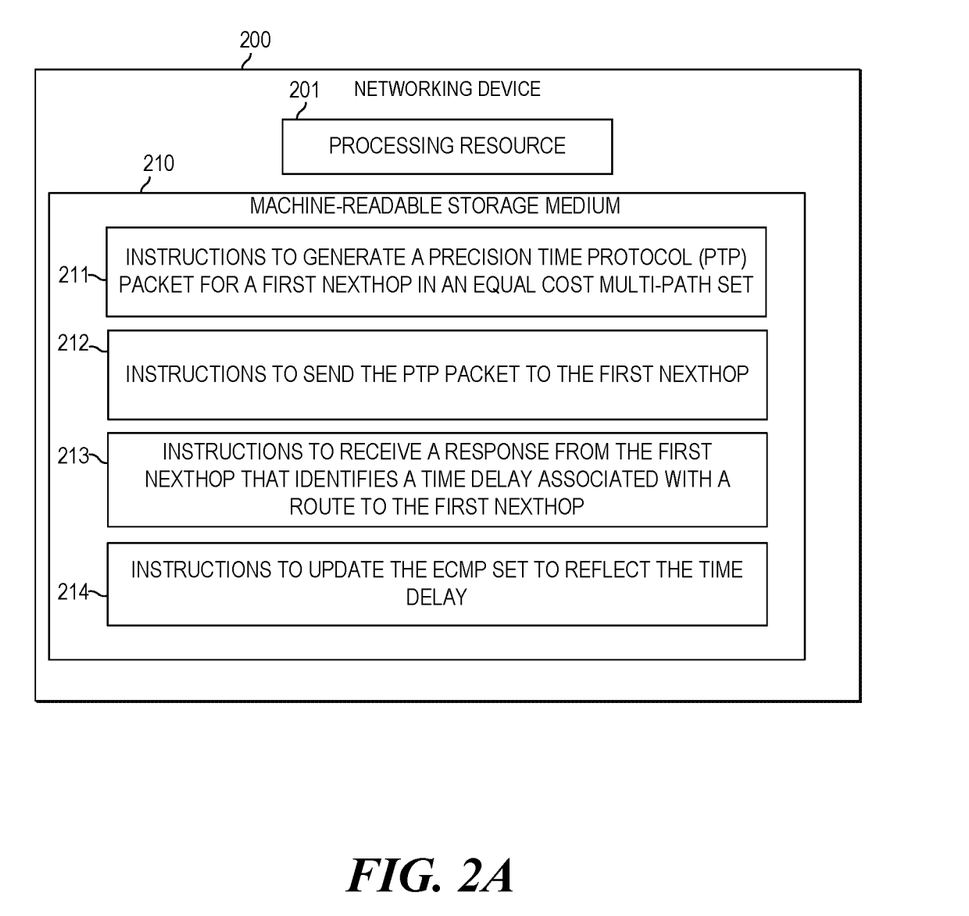
FIG. 2A is a block diagram of a networking device to determine an Equal-Cost Multi-Path (ECMP) set based on a time delay, according to some examples.

FIG. 2A is a block diagram of a networking device 200 to modify an ECMP set based on a time delay of a nexthop. As used herein, a networking device may be a device used in a network for the transmission of packets to the network (e.g. from an outside network), from the network (e.g. to an outside network), and/or within the network (from one device in the network to another device in the network). Non-limiting examples of a networking device include a router, switch, etc. Networking device 100 may be connected to other computing devices in the network. As used herein, a "computing device" may include a server, a networking device, a chipset, a desktop computer, a workstation, a mobile phone, a tablet, an electronic reader, or any other processing device or equipment.

Networking device 200 includes a processing resource 201 and a machine-readable storage medium 210, Machine readable storage medium 210 may be in the form of non-transitory machine-readable storage medium, such as suitable electronic, magnetic, optical, or other physical storage apparatus to contain or store information such as instructions 211, 212, 213, 214, related data, and the like. As used herein, "machine-readable storage medium" may include a storage drive (e.g., a hard drive), flash memory, Random Access Memory (RAM), content-addressable memory (CAM), any type of storage disc (e.g., a Compact Disc Read Only Memory (CD-ROM), any other type of compact disc, a DVD, etc.) and the like, or a combination thereof. In some examples, storage medium 210 may include different types of memory for different types of information. In some examples, a storage medium may correspond to memory including a main memory, such as a Random Access Memory, where software may reside during runtime, and a secondary memory. The secondary memory can, for example, include a non-volatile memory where a copy of software or other data is stored. The storage medium 210 may also include a memory separate from main memory, such as a content addressable memory (CAM), to hold data that is used for networking (e.g., forwarding).

In the example of FIG. 2, instructions 211, 212, 213, 214, are stored (encoded) on storage medium 210 and are executable by processing resource 201 to implement functionalities described herein in relation to FIG. 2. In some examples, storage medium 210 may include additional instructions, like, for example, the instructions to implement some of the functionalities described in relation to networking device 300 in FIG. 3. In other examples, the functionalities of any of the instructions of storage medium 210 may be implemented in the form of electronic circuitry, in the form of executable instructions encoded on machine-readable storage medium, or a combination thereof.

Processing resource 201 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 211, 212, 213, and 214, as described herein.

Instructions 211 may be executable by processing resource 201 to generate a precision time protocol (PTP) packet for a first nexthop in an ECMP set. In PTP, a master-slave architecture may be used for clock distribution. Under this architecture, a time distribution system includes network segments and one or more clocks. A clock may be a device in a single network segment and is either the source or destination (slave) for a synchronization reference. A grandmaster is a clock that is used for root timing reference. The grandmaster transmits synchronization information to the clocks residing on its network segments.

Accordingly, networking device 200 becomes the grandmaster in this PTP architecture and the first nexthop in the ECMP set is the slave. In other words, the networking device 200 transmits synchronization information to the first nexthop (and all the intermediate nodes inbetween). In some examples, the PTP packet that is generated is a DELAY_RESP packet. The packet may include a unique identifier that is associated with the first nexthop. This allows networking device 200 to distinguish between different nexthops in the ECMP set. For example, an ECMP set may have five different nexthops that is initially determined by a routing protocol used by networking device 200. This initial ECMP set is stored in a forwarding data structure of networking device 200. Networking device 200 may send five PTP packets, one to each of the five different nexthops in the initial ECMP set. Accordingly, the unique identifier allows networking device 200 to keep each packet unique from the other packet. In some examples, the unique identifier may include a Differentiated Service Code Point (DSCP) that is set in the IP header of the packet. An example of a PTP packet is discussed in relation to FIG. 2C.

Instructions 212 may be executable by processing resource 201 to send the PTP packet to the first nexthop. Accordingly, networking device 200 may route the networking device 200 to an interface (e.g. port) on networking device 200 that links to the first nexthop. The packet leaves networking device 200 via this interface and is received by the next networking device in line to the first nexthop. The PTP packet is generated and sent independently of any user data packets. In other words, it is a packet separate from user data packets.

In some examples, the next networking device is not the first nexthop but an intermediate node that sits between networking device 200 and the first nexthop. Networking device 200 and the nexthops (including first nexthop) in the ECMP set may run protocols of equal or higher levels of the 7 layer OSI model. For example, networking device 200 and the nexthops may run layer 2 and layer 3 protocols. However, the intermediate node that sits between networking device 200 and the first nexthop may run lower layer routing protocols. For example, the intermediate node may run only layer 2 protocols. Thus, the intermediate node may transparently forward the PTP packet on to the next networking device in line to the first nexthop, but it may not have any ECMP functionality. The intermediate node may calculate the time that the packet spends in the intermediate node, as determined by the egress time minus the ingress time. This time delay of the intermediate node may be characterized as an intermediate time delay. The intermediate node adds this intermediate time delay to the correction field of the PTP packet. The total intermediate time delay of all the intermediate nodes may be characterized as an accumulated time.

Upon the first nexthop receiving the PTP packet, the PTP packet includes the accumulated time that the packet spent in the intermediate node. Accordingly, the first nexthop (the slave device) traps the PTP packet and sends the accumulated time back to networking device 200 (the grandmaster device). In some examples, the accumulated time is sent with the unique identifier such that networking device 200 may associate the accumulated time with the first nexthop. Accordingly, the accumulated time represented the time delay that is associated with a route to the first nexthop.

Instructions 213 may be executable by processing resource 201 to receive the response from the first nexthop. The response may identify the time delay associated with the route to the first nexthop. Instructions 214 may be executable by processing resource 201 to update the ECMP set to reflect the time delay. For example, the ECMP set may include five first nexthops. Networking device 200 may send five PTP packets, one to each of the five nexthops. Networking device 200 may also get five responses, each response indicating the time delay associated with each of the five nexthops. The first nexthop may have the smallest time delay out of the five nexthops. Additionally, three nexthops may have the same time delay and the fifth nexthop may have the largest time delay. Accordingly, instructions 214 may update the forwarding data structure of networking device 200 to update the ECMP set. For example, sub-sets may be created in the ECMP set that group the first nexthop and the fifth nexthop by themselves, while grouping the three nexthops in the same sub-set. As another example, instructions 214 may, instead of updating the forwarding data structure to create sub-sets within the ECMP set, may add these time delays to the costs that have been calculated by the routing protocol for each nexthop in the ECMP set, thus changing the composition of the ECMP set. Accordingly, the first nexthop may be in its own ECMP set while the three nexthops may be in their own set.

Networking device 200, which is described in terms of instructions and processing resource, may include aspects of networking device 300 of FIG. 2.

Figure 2B:
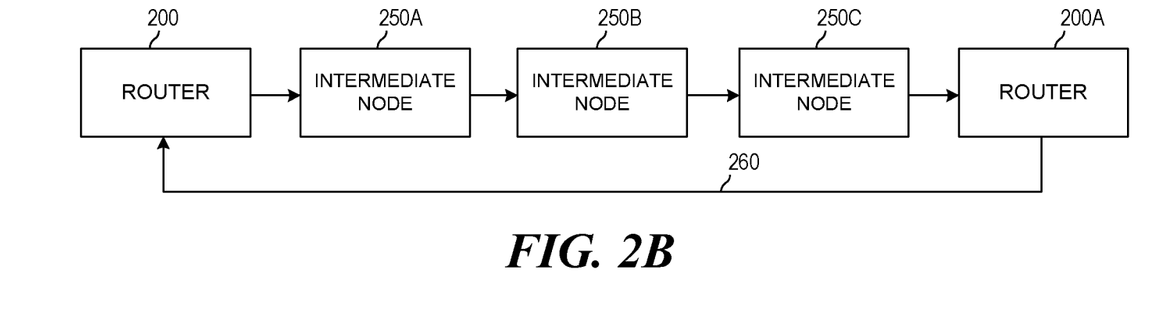
FIG. 2B is a block diagram of the path of a Precision Time Protocol (PTP) packet, according to some examples.

FIG. 2B illustrates a block diagram of a route from a router (such as networking device 200) to a first nexthop router 200A. The route includes intermediate nodes 250A, 250B and 250C. Accordingly, the PTP packet is generated and sent by router 200 to first nexthop router 200A. On the way, the packet is received by intermediate node 250A which forwards it to intermediate node 250B which forwards it to intermediate node 250C which then forwards it to router 200A.

The PTP packet spends a time interval in intermediate node 250A. Accordingly, intermediate node 250A calculates this time as an egress time minus an ingress time and modifies the PTP packet correction field to show the time spent. Intermediate node 250B receives the PTP packet. The PTP packet spends a time interval in intermediate node 250B. Intermediate node 250B calculates this time as an egress time minus an ingress time and modifies the PTP packet correction field to show the time spent in intermediate node 250B, adding it (or accumulating it) to the value that was put there by intermediate node 250A. Intermediate node 250C does the same when it receives the PTP packet. When the PTP packet arrives at first nexthop (router 200A), the PTP packet comprises the accumulated time of intermediate nodes 250A. 250B, and 250C. Router 200A sends this accumulated time back to router 200, as represented by line 260 in FIG. 2B. Accordingly, networking device 200 is able to capture the time delays of intermediate nodes 250A, 250B, and 250C which is not accounted for in the routing protocol.

Figure 2C:
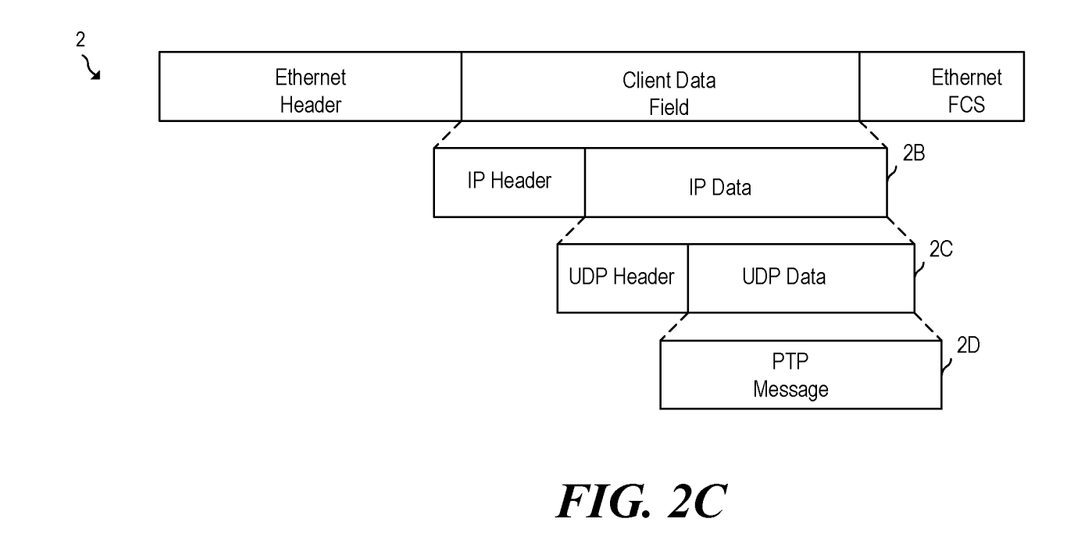
FIG. 2C is a representative figure of a PTP packet, according to some examples.

FIG. 2C illustrates an example PTP packet 2 that may be sent by router 200. The PTP packet comprises an Ethernet header, an Ethernet FOS, and a Client Data Field. As shown by 2B, the Client Data Field may be broken down into an IP Header and IP Data. The IP Data may subsequently be broken down into a UDP (User Datagram Protocol) Header and UDP Data, as shown by 2C. The PTP message, the DELAY_RESP, is contained within the UDP Data, as shown by 2D. The correction field where the time delays of the intermediate nodes are accumulated are contained within the PTP message and may be found in a fixed position from the beginning of the PTP Header.

Figure 3:
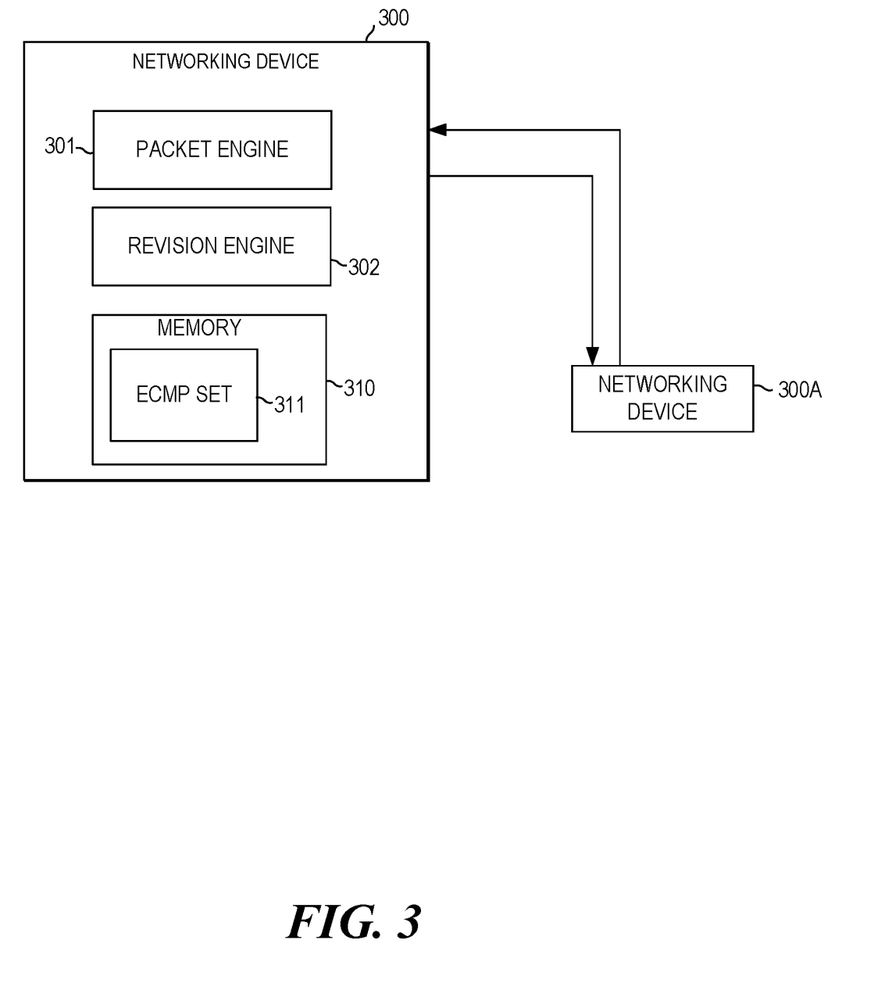
FIG. 3 is a block diagram of a networking device with a revision engine to modify an ECMP set, according to some examples.

FIG. 3 shows a block diagram of a networking device 300 connected to networking device 300A. Networking device 300 comprises a packet engine 301, a revision engine 302, and a memory 310.

Each of engines 301, 302 and any other engines, may be any combination of hardware (e.g., a processor such as an integrated circuit (ASIC) or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or hardware and software hosted at hardware. Additionally, as used herein, the singular forms "a," "an," and "the" include plural referents unless the context clearly dictates otherwise. Thus, for example, the term "engine" is intended to mean at least one engine or a combination of engines.

Each engine of networking device 300 can include at least one machine-readable storage mediums (for example, more than one) and at least one computer processor (for example, more than one). For example, software that provides the functionality of engines on networking device can be stored on a memory of the networking device 300 to be executed by a processor of networking device 300.

Memory 310 may comprise a storage medium as discussed above. In some examples, memory 310 may be separate from the memory that stores the software and/or data for the functionality of engines on networking device and comprises a storage medium that allows for quick retrieval of information that is used for moving (e.g., forwarding) data packets received by networking device 300. A non-limiting example for memory 310 is a CAM. Memory 310 may be used to store a forwarding data structure which stores ECMP set 311. In some examples, the forwarding data structure comprises a Forwarding Information Base (FIB). In some examples, storing forwarding data structure 311 in a specialized memory such as a CAM separate from data used to determine routing decisions (e.g., data used by routing engine 301) allows for a separation in networking device 300 between the portion of the networking device 300 that determines a best path for a specific packet and the portion that handles the packet forwarding. This allows for a more consistent performance of the data forwarding by networking device 300.

In some examples, networking device 300 may comprise a routing engine (not shown in FIG. 3). Routing engine of networking device 300 may run the routing protocol that initially determines ECMP set 311. In some examples, the routing engine may be implemented by software hosted at hardware (e.g., instructions that is stored at a memory and executed or interpreted at a central processing unit (CPU)) while packet engine 301 and revision engine 302 are implemented by hardware (e.g., ASIC, etc.) Upon determination of ECMP set 311 by the routing engine, revision engine 302 may store the ECMP set in memory 310 of networking device 300. This allows networking device 300 to quickly forward packets to the nexthop devices. However, in other examples, networking routing engine, packet engine 301, and revision engine 302 may all be implemented by software hosted at hardware.

ECMP set 311 may include a number of nexthops, including a first nexthop, a second nexthop, a third nexthop, etc. The number of nexthops in ECMP set 311 are determined by routing protocol run by networking device 300 to be of equal cost. One of the nexthops in ECMP set 311 is networking device 300A.

Packet engine 301 includes a combination of hardware and software that allows networking device 300 to generate a PTP packet for a nexthop in ECMP set 311. As discussed above, the PTP packet is separate from a user data packet that is forwarded or received by networking device 300. The PTP packet may be carried in the UDP Data field of the Ethernet packet, Networking device 300 is considered the grandmaster in the PTP architecture while the nexthop is considered the slave.

As discussed above, the PTP packet may include a unique identifier such that the PTP packet may be kept unique from other PTP packets. In some examples, the unique identifier include a DSCP value.

Packet engine 301 also allows networking device 300 to send the PTP packet to the nexthop (networking device 300A). For example, packet engine 301 may send the PTP packet to the interface (port) from networking device 300 that is connected to the nexthop.

Packet engine 301 also allows networking device 300 to receive a response from the nexthop, where the response comprises a time delay associated with the nexthop. As discussed above, the time delay associated with the nexthop may include the time that the PTP packet spends in intermediate nodes that sit between networking device 300 and the nexthop (networking device 300A), as discussed above in relation to FIG. 2B. For example, when there are two intermediate nodes between networking device 300 and the nexthop (networking device 300A), the PTP packet received by the nexthop will have recorded in it (e.g., in the correction field of the PTP packet) the accumulated time that the packet spent in the two intermediate nodes. Accordingly, networking device 300A may send this accumulated time to networking device 300, which is received by packet engine 301.

Revision engine 302 includes a combination of hardware and software that allows networking device 300 to update ECMP set 311 in memory 310 based on the time delay received by packet engine 301. In some examples, this may be an update of the ECMP set 311 to include sub-sets. For example, if the original ECMP set 311 includes 5 nexthops, revision engine 302 can revise it to distinguish between these 5 nexthops based on the time delays of each nexthops.

For example, the time delay associated with networking device 300A may be the smallest out of the 5 nexthops in ECMP set 311. The other four may all be different from each other. Thus, revision engine 302 may update ECMP set 311 to include 5 sub-sets, one for each of the 5 nexthops. Additionally, the 5 sub-sets may also indicate a preferred order, indicating that the nexthop of networking device 300A is most preferred, etc. Accordingly, networking device 300 has a ECMP set that is more accurate than one provided by routing protocol. The time delay may also be dynamically calculated allowing for the ECMP set to be dynamically updated as network connections change as compared to the ECMP set provided by the routing protocol.

Accordingly, the next time a data packet arrives at networking device 300 with the destination device associated with the ECMP set, networking device may determine a forwarding route based on the updated ECMP set using the sub-sets created by revision engine 302. Thus, instead of using any of the five nexthops in the ECMP set, it may send the data packet to networking device 300A, as it is the nexthop that is most preferred in the updated ECMP set.

In some examples, networking device 300A may have its own packet engine, revision engine, and memory similar to those described in relation to networking device 300. Accordingly, it may determine time delays associated to ECMP set(s) stored in its memory and revise the ECMP set accordingly.

Networking device 300, which is described in terms of engines, may include aspects of networking device 200 of FIG. 2.

Figure 4:
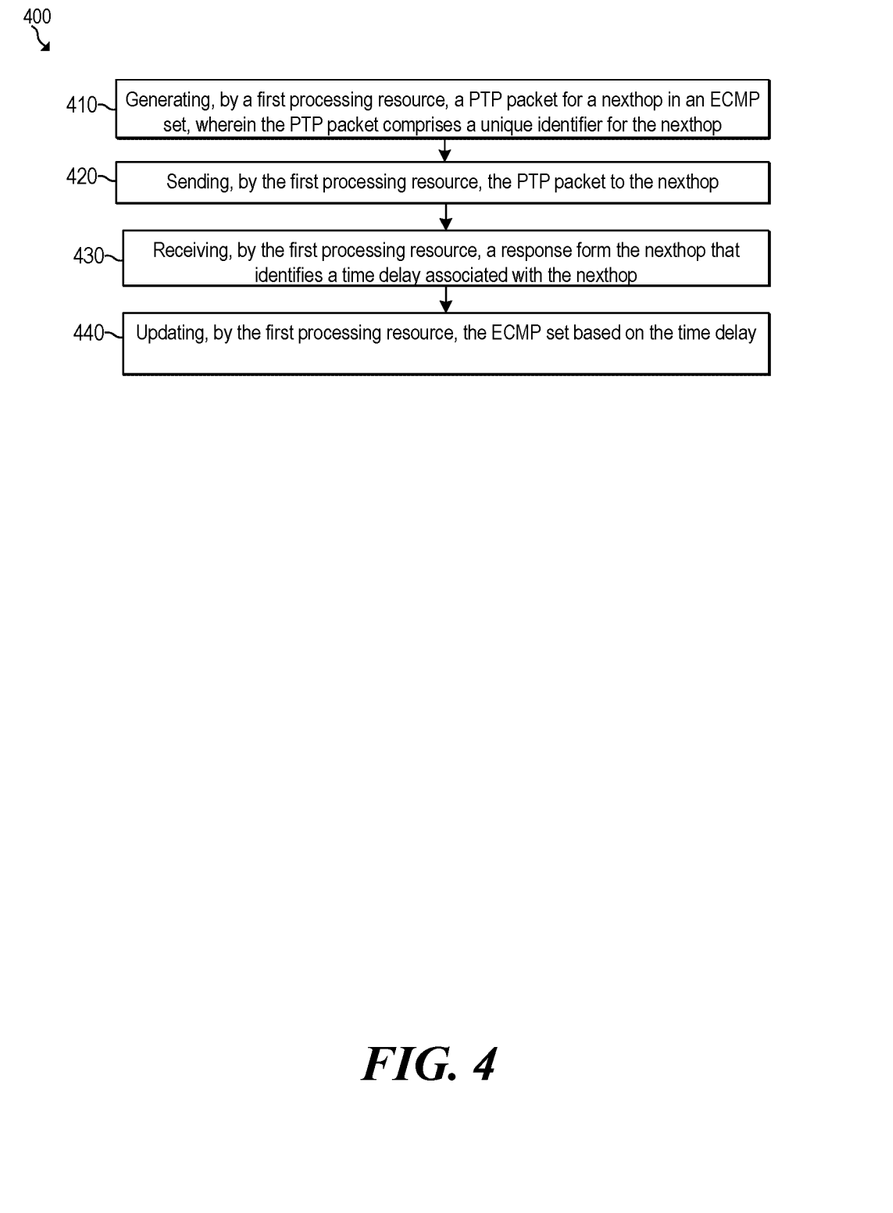
FIG. 4 is a block diagram of a flowchart of sending a PTP packet to a nexthop in an ECMP set, according to some examples.

FIG. 4 illustrates a flowchart for method 400 to send a PTP packet for a nexthop in an ECMP set. Although execution of method 400 is described below with reference to networking device 300, other suitable devices for execution of method 400 may be used (e.g., networking device 200 of FIG. 2.)

At 410, packet engine 301 of networking device 300 may generate a PTP packet for a nexthop in ECMP set 311. The nexthop may be networking device 300A. As discussed above, the PTP packet may comprise a unique identifier for the nexthop. In some examples, the unique identifier may be a ©SCP value in the PTP packet.

At 420, packet engine 301 may send the PTP packet to the nexthop. This may be accomplished by egressing the PTP packet out of the interface that is linked to the nexthop. The PTP packet, on its way to the nexthop, may encounter at least one intermediate node. The intermediate node may determine a time that the PTP packet spends in the intermediate node and update a correction field in the PTP packet accordingly. This time delay may be characterized as an intermediate time delay.

When the networking device 300A receives the PTP packet, the PTP packet includes the accumulated time delay of all the intermediate nodes between networking device 300 and networking device 300A. The networking device 300A may also trap the PTP packet. This may be accomplished by a processing resource on networking device 300A. For example, a packet engine of networking device 300A may receive the PTP packet sent by networking device 300. The same packet engine 300A may trap the PTP packet. Networking device 300A may send a response to networking device 300 indicating the time delay that is associated with itself. The time delay includes the accumulated time delay of all the intermediate nodes between networking device 300 and networking device 300A.

At 440, packet engine 301 of networking device 300 may update ECMP set 311 on memory 310 to reflect the time delay, as discussed above in relation to FIG. 3. For example, in some situations, the ECMP set 311 on memory 310 may be updated to include sub-sets.

Although the flowchart of FIG. 4 shows a specific order of performance of certain functionalities, method 400 is not limited to that order. For example, some of the functionalities shown in succession may be performed in a different order, may be executed concurrently or with partial concurrence, or a combination thereof. In some examples, functionalities described herein in relation to FIG. 4 may be provided in combination with functionalities described herein in relation to any of FIGS. 1-3.

All of the features disclosed in this specification (including any accompanying claims, abstract and drawings), and/or all of the elements of any method or process so disclosed, may be combined in any combination, except combinations where at least some of such features and/or elements are mutually exclusive,

We claim:

1. A non-transitory machine-readable storage medium comprising instructions, that when executed, cause a processing resource to:
   generate a Precision Time Protocol (PTP) packet for a first nexthop in an Equal Cost Multi-Path (ECMP) set, wherein the PTP packet for the first nexthop comprises a unique Differentiated Service Code Point (DSCP) value associated to the first nexthop;
   send the PTP packet to the first nexthop;
   receive a response from the first nexthop that identifies a time delay associated with a route to the first nexthop;
   update the ECMP set based on the time delay;
   generate a PTP packet for a second nexthop in the ECMP set, wherein the PTP packet for the second nexthop comprises a unique DSCP value associated to the second nexthop;
   send the PTP packet to the second nexthop;
   receive a response from the second nexthop that identifies a second time delay associated with a route to the second nexthop;
   update the ECMP set to reflect the second time delay; and
   determine a route for a data packet based on the updated ECMP set.

2. The non-transitory machine-readable storage medium of claim 1,
   wherein the route to the first nexthop comprises an intermediate node; and
   wherein the time delay includes an intermediate time delay associated with t intermediate node.

3. The non-transitory machine-readable storage medium of claim 1, wherein the PTP packet comprises a unique Differentiated Services Code Point (DSCP) value associated to the first nexthop.

4. The non-transitory machine-readable storage medium of claim 1, wherein the PTP packet is sent separate from a data packet.

5. A networking device comprising:
   a memory to store information associated to an ECM IP set, the ECMP set comprising a nexthop,
   a packet engine to:
      generate a Precision Time Protocol (PTP) packet for the nexthop;
      send the PTP packet to the nexthop;
      receive a response from the nexthop in the Equal Cost Multi-Path (ECMP) set, wherein the response comprises a time delay associated with the nexthop wherein the PIP packet for the first nexthop comprises a unique Differentiated Service Code Point (DSCP) value associated to the first nexthop;
      generate a PTP packet for a second nexthop in the ECMP set, wherein the PTP packet for the second nexthop comprises a unique DSCP value associated to the second nexthop;
      send the PTP packet to the second nexthop;
      receive a response from the second nexthop that identifies a second time delay associated with a route to the second nexthop;
   a revision engine to:
      update the ECMP set in the memory based on the time delay, and update the ECMP set to reflect the second time delay; and determine a route for a data packet based on the updated ECMP set.

6. The networking device of claim 5, wherein the time delay comprises an intermediate time delay of an intermediate node associated with the nexthop.

7. The networking device of claim 5, wherein the time delay comprises a accumulated time delay of a number of intermediate nodes associated with the nexthop.

8. The networking device of claim 5,
wherein the ECMP set comprises a plurality of nexthops; and
wherein the packet engine is to:
generate and send a PTP packet for each of the plurality of nexthops; and
receive a response from each of the plurality of nexthops, wherein each response comprises a time delay associated with the nexthop; and
wherein the revision engine is to:
update the ECMP set in the memory based on each of the time delays.

9. The networking device of claim 8, wherein the each PIP packet comprises a unique identifier for each of the plurality of nexthops.

10. The networking device of claim 5, wherein the ECMP is stored on a Forwarding Information Base (FIB) in the memory.

11. A method comprising:
generating, by a first processing resource, a Precision Time Protocol (PTP) packet for a nexthop in an Equal Cost Multi-Path (ECMP) set, wherein the PTP packet comprises a unique Differentiated Service Code Point (DSCP) value associated to the first nexthop;
sending, by the first processing resource, the PTP packet to the nexthop;
receiving, by the first processing resource, a response from the nexthop that identifies a time delay associated with the nexthop;
updating, by the first processing resource, the ECMP set based on the time delay;
generating a PTP packet for a second nexthop in the ECMP set, wherein the PTP packet for the second nexthop comprises a unique DSCP value associated to the second nexthop;
sending, by the first processing resource, the PIP packet to the second nexthop;
receiving, by the first processing resource, a response from the second nexthop that identifies a second time delay associated with a route to the second nexthop;
updating, by the first processing resource, the ECMP set to reflect the second time delay; and
determining, by the first processing resource, a route for a data packet based on the updated ECMP set.

12. The method of claim 11, wherein the time delay reflects an intermediate time delay of an intermediate node associated with the nexthop.

13. The method of claim 11, comprising, determining, by the first processing resource, a route to send a data packet based on the updated ECMP.

14. The method of claim 11, comprising:
receiving, by a second processing resource, the PTP packet;
trapping, by the second processing resource, the PTP packet;
sending, by the second processing resource, to the first processing resource the response.

15. The method of claim 11, wherein the PTP packet comprises a delay response PTP message.

\* \* \* \* \*